June 3, 1930.  A. A. THOMAS  1,761,648
CHAIN FASTENER
Filed June 22, 1929
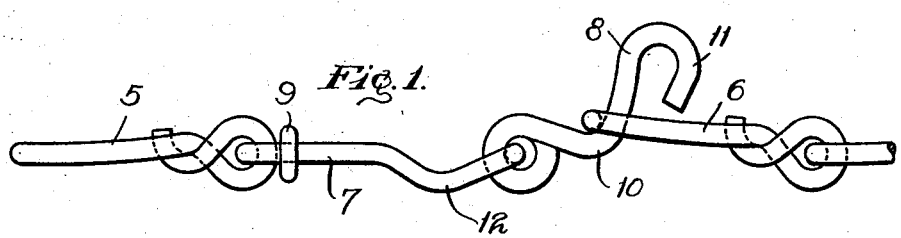
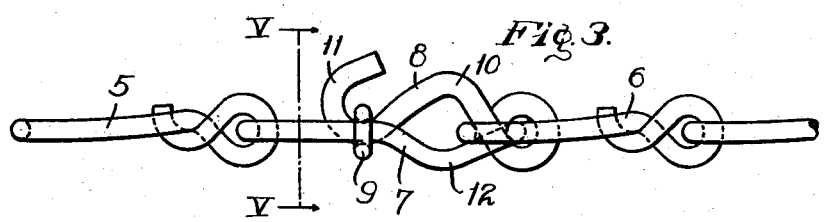
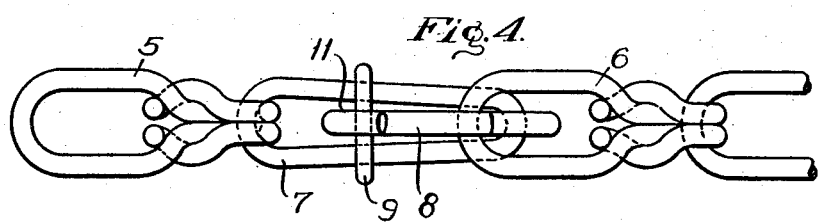
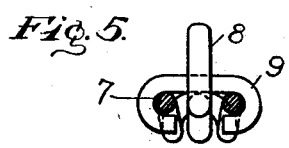
INVENTOR
Albin A. Thomas,
By Archworth Martin,
Attorney Patented June 3, 1930

1,761,648

UNITED STATES PATENT OFFICE

ALBIN A. THOMAS, OF YORK, PENNSYLVANIA, ASSIGNOR TO UNITED STATES CHAIN & FORGING COMPANY, OF PITTSBURGH, PENNSYLVANIA, A CORPORATION OF DELAWARE

CHAIN FASTENER

Application filed June 22, 1929. Serial No. 373,010.

My invention relates to chain fasteners, and more particularly to tightening and connecting devices such as are employed in fastening the side chains of anti-skid chain structures that are employed on automobile wheels, but it is capable of use in various other relations.

One object of my invention is to provide a fastening device of the type referred to that is more freely operable than various types which have heretofore been employed and which nevertheless securely retains the connected links against accidental displacement.

Another object of my invention is to provide a fastening device wherein the necessity for snug-fitting movable parts which are difficult of operation through the presence of grit, rust, etc., is avoided.

Still another object of my invention is to provide a fastening device composed of relatively movable parts of such form that the tension of the side chains upon the parts of said device is distributed advantageously.

One form which my invention may take is shown in the accompanying drawing, wherein Figure 1 is a side elevational view of the device showing the fastener in partially open position; Fig. 2 shows the latching lever in closed position, but with the keeper in released position; Fig. 3 shows the device in completely locked position; Fig. 4 is a plan view of the structure of Fig. 3, and Fig. 5 is a view taken on the line V—V of Fig. 3.

The fastener is shown as employed for connecting end links 5 and 6 of a side chain or the like and comprises a connector link 7, a latching lever 8, and a keeper 9.

The lever 8 has a bent portion 10 which serves as a seat for the link 6 and a hook portion 11 that is engaged by the keeper 9 when the lever is in closed position, as shown in Fig. 2.

In effecting connection between the links 5 and 6, the free end of the lever 8 is passed through the link 6 as shown in Fig. 1, and is then swung to the left until its hook portion 11 extends below the plane of the connecting link 7, whereupon the keeper 9 is shifted from the position shown in Fig. 1 to the position shown in Fig. 3. The lever 8 may then be permitted to swing slightly in a clockwise direction under the tension of the chain links 5 and 6.

The keeper is not likely to become accidentally disengaged from the hook 11 through slackening of the chain links, since if the connecting link 7 is in a horizontal position when such slackness occurs, the keeper 9 obviously will remain in the position shown in Fig. 3, while if the right hand end of the link 7 is elevated at a time when slackness occurs, the lower portion of the keeper will slide into the hook 11 and thus be held against movement to the position shown in Fig. 1. On the other hand, if the left hand end of the link 7 is in elevated position when the chain is slack, the keeper 9 will slide toward the right hand end of the link and lie against the body portion of the lever 8, so that when a pull is again exerted on the hook, the keeper will be forced into the locking position shown in Fig. 3.

The ends of the keeper 9 are of such distance apart that they will permit the bent portion 11 of the lever 8 to pass between them and thus allow the upper straight portion of the keeper to be moved from the position shown in Fig. 2 to that shown in Fig. 3.

As shown more clearly in Fig. 3, the link 7 is bent or offset at 12 so that when the parts are in fastened position as shown in Fig. 3, the tension of the link 6 will be against the point of pivotal connection between the parts 7 and 8, instead of being carried entirely by one of these parts, as in various prior art patents. This tension serves to not only hold the latching lever 8 under tension and hence maintain the keeper 9 in position, but is also substantially in line with the longitudinal axis of the link 7 and of its point of connection to the link 5.

In opening the link, it is necessary only that the thumb be pressed against the upper or outer side of the hook portion 11, or the outer side of the bend or hump 10 in order to depress the lever 8 to the position shown in Fig. 2, and thus permit the keeper 9 to be slid to released position. The extremity of the hook portion 11 need only be moved into the plane of the link 7, as shown in Fig. 2, to permit the keeper to be slid to released position because of the space between the ends of the keeper as shown in Fig. 5, and need not be moved to a point completely below the lowermost plane of the keeper.

The parts 7 and 8 may be formed of wire stock that is little if any heavier than the stock from which the chain links 5 and 6 are formed, and it will be seen that the arrangement of the parts is such that the fastener as a whole does not occupy space much greater than that required for ordinary chain links, thus avoiding excessive protuberances which are objectionable at the sides of a tire.

I claim as my invention:

1. A chain fastener comprising a connecting link, a latch lever pivotally connected to said link, and means for releasably holding said latch lever in closed position, the said lever and link being oppositely offset at points adjacent to their point of pivotal connection, to form a seat for a link that is to be connected to said fastener.

2. A chain fastener comprising a connector-link adapted for permanent connection with an end link of a chain, a latch lever pivotally connected to said link at a point remote from the first-named connection, and means for releasably holding said lever in closed position, the said link and said lever being oppositely offset to form a seat for the other end link of a chain, substantially in line with the said point of connection.

3. A chain fastener comprising a connecting link of elongated loop form, a keeper extending across the outer side of said link and having its ends turned back to partially embrace the link, and a latch lever pivotally connected to one end of the link and having its free end bent outwardly and backwardly to form a hook, the ends of the keeper and the sides of said link being respectively spaced apart such distance as to permit movement of the said hook portion therethrough, and the said link being inwardly offset for the reception of a chain link.

4. A chain fastener comprising a connecting link of elongated loop form, a keeper extending across the outer side of said link and having its ends turned back to partially embrace the link, and a latch lever pivotally connected to one end of the link, and having its free end bent outwardly and backwardly to form a hook, the ends of the keeper and the sides of said link being respectively spaced apart such distance as to permit movement of the said hook portion therethrough, the said hook and link being oppositely offset for the reception of a chain link.

5. A chain fastener comprising a connecting link of elongated loop form, a latch lever pivotally connected to one end of the link and movable into position between the sides thereof, and means for releasably retaining the latch lever in position, the latch lever and the link being oppositely offset at points intermediate their ends, to provide a seat therebetween for a chain link.

In testimony whereof I, the said ALBIN A. THOMAS have hereunto set my hand.

ALBIN A. THOMAS.